(12) United States Patent
Liu et al.

(10) Patent No.: US 12,007,084 B2
(45) Date of Patent: Jun. 11, 2024

(54) NATURAL LIGHT HOMOGENIZATION LIGHTING DEVICE AND METHOD BASED ON FREE-FORM SURFACE AND SAWTOOTH GRATING

(71) Applicant: GLORY LIGHT TECHNOLOGY CO., LTD., Harbin (CN)

(72) Inventors: Jian Liu, Harbin (CN); Xumin Ding, Harbin (CN); Xinwei Wang, Harbin (CN); Chenguang Liu, Harbin (CN)

(73) Assignee: GLORY LIGHT TECHNOLOGY CO., LTD., Harbin (CN)

( * ) Notice: Subject to any disclaimer, the term of this patent is extended or adjusted under 35 U.S.C. 154(b) by 0 days.

(21) Appl. No.: 18/095,398

(22) Filed: Jan. 10, 2023

(65) Prior Publication Data
US 2023/0220967 A1    Jul. 13, 2023

(30) Foreign Application Priority Data
Jan. 11, 2022 (CN) .......................... 202210028328.9

(51) Int. Cl.
F21S 11/00 (2006.01)
F21V 5/02 (2006.01)

(52) U.S. Cl.
CPC .......... F21S 11/002 (2013.01); F21S 11/007 (2013.01); F21V 5/02 (2013.01)

(58) Field of Classification Search
CPC .......... F21S 11/002; F21S 11/007; F21V 5/02
See application file for complete search history.

(56) References Cited

U.S. PATENT DOCUMENTS

| | | | | |
|---|---|---|---|---|
| 637,145 | A | * 11/1899 | Moffat et al. | F21V 5/02 |
| | | | | 359/594 |
| 720,386 | A | * 2/1903 | Wadsworth | F21V 5/08 |
| | | | | 359/593 |
| 7,980,712 | B2 | * 7/2011 | Horii | G02F 1/133606 |
| | | | | 362/333 |
| 9,180,635 | B2 | * 11/2015 | Suzuki | G02B 19/0028 |

(Continued)

FOREIGN PATENT DOCUMENTS

CN    213204470 U  *  5/2021
CN    218209345 U  *  1/2023

*Primary Examiner* — Christopher E Mahoney
(74) *Attorney, Agent, or Firm* — IPro, PLLC

(57) ABSTRACT

The present invention discloses a natural light homogenization lighting device and method based on free-form surface and sawtooth grating, and the device can be used as lighting curtains, indoor shutters, window glasses and the like. The device includes a front surface and a rear surface in an array form, the first surface is a free-form surface array, the second surface is a sawtooth surface array, and the free-form surface array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface. The present invention can efficiently collect the natural light incident into the window, disperse the light evenly to all directions indoors, homogenize the indoor lighting, and effectively protect the indoor privacy. The device is thin and easy to mass produce, environmentally friendly and pollution-free.

5 Claims, 2 Drawing Sheets

(56) References Cited

U.S. PATENT DOCUMENTS

| | | | |
|---|---|---|---|
| 10,012,356 B1* | 7/2018 | Rogers | E06B 9/24 |
| 2014/0198390 A1* | 7/2014 | Padiyath | G02B 5/04 |
| | | | 359/591 |
| 2015/0153013 A1* | 6/2015 | Wu | G02B 3/0068 |
| | | | 359/593 |

* cited by examiner

NATURAL LIGHT HOMOGENIZATION LIGHTING DEVICE AND METHOD BASED ON FREE-FORM SURFACE AND SAWTOOTH GRATING

TECHNICAL FIELD

The present invention belongs to the field of lighting system design and beam shaping, and relates to a device and method for natural light shaping. Through the designed monolithic natural light homogenization lighting device, the natural light incident from the window in the daytime can be evenly dispersed to all corners indoors, thereby making full use of natural light for indoor lighting, saving energy and reducing emissions, and improving the energy utilization rate, and the indoor privacy can be protected effectively. The device is thin and easy to mass produce, environmentally friendly and pollution-free, and can be used as lighting curtains, indoor shutters, window glasses and the like.

BACKGROUND

Research and development of natural light lighting technology in China started in the 1960s and 1970s. Since the "Green Lighting" Program was promoted in 1996, the green energy concept of natural light lighting has gradually come into the public view. With continuous in-depth research on the solar lighting technology, people also have an in-depth understanding of the natural light collection and lighting systems. Due to gradual depletion of natural resources such as oil and coal, researches on solar energy are increasing, and the shortcomings of solar energy application technology lie in relatively low conversion efficiency of solar energy, but the cost is much higher than that of other traditional conversion energy methods. Therefore, improving the utilization efficiency of solar energy and reducing the conversion cost of solar energy have become important goals of researches in recent years.

In order to improve the utilization efficiency of sunlight, one of the methods is to use a solar concentrator combined with a light guide component module, whereby the sunlight is guided through the light guide component and conducted to the solar cells or thermal conduction components to improve the collection efficiency of sunlight, thereby improving the production efficiency of solar energy conversion devices. The known solar energy conversion devices require solar concentrators to gather the incident sunlight to many focal points on the light output side for use by solar cells or thermal conduction components. However, the focal length converging the light results in a huge volume of the known solar energy conversion devices, and such huge volume of devices not only requires relatively higher production and material costs and is hard to precisely move to control the sun tracking, but also requires a large area for installing the devices. The light pipes currently occupying the mainstream of the market suffer low efficiency and poor lighting uniformity, and may cause damage to the original building structure in the process of installation, which is not conducive to the promotion and popularization.

Therefore, how to perform the solar daylighting in an efficient manner on the basis of not changing the original building structure is an urgent problem to be solved by those skilled in the art.

SUMMARY

A brief overview of the present invention is given below in order to provide a basic understanding of some aspects of the present invention. It should be understood that such overview is not an exhaustive overview of the present invention. It is intended neither to identify key or important parts of the present invention, nor to limit the scope of the present invention. Its purpose is merely to present some concepts in a simplified form as a prelude to a more detailed description to be discussed later.

In view of this, the present invention provides an array-type natural light homogenization lighting device and method based on free-form surface and sawtooth grating, which can make the natural light incident from the window in the daytime evenly dispersed to all corners indoors, thereby making full use of natural light for indoor lighting, saving energy and reducing emissions, and improving the energy utilization rate.

To achieve the above objective, the present invention adopts the following technical solution:

a natural light homogenization lighting device based on free-form surface and sawtooth grating, including a front surface and a rear surface in an array form, the first surface is a free-form surface array, the second surface is a sawtooth surface array, and the free-form surface array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface.

Preferably, the additional phase modulation $\varphi_1$ of the free-form surface array to the incident light can be expressed as $$\varphi_1 = -\frac{\pi(x_1^2 + y_1^2)}{\lambda f} - \frac{2\pi}{\lambda} y_1 \cdot \sin\vartheta_1,$$

where $\vartheta_1$ represents the incident angle of natural light on the free-form surface, $\lambda$ represents the central wavelength of the incident light, f represents the equivalent focal length of the free-form surface, $x_1$ and $y_1$ are the positions of the incident wavefront of the free-form surface array, while the additional phase modulation $\varphi_2$ of the sawtooth surface array to the incident natural light can be expressed as $$\varphi_2 = -\frac{2\pi}{\lambda} y_2 \cdot \sin\vartheta_2$$

where $y_2$ represents the position of the incident wavefront of the sawtooth surface array, and $\vartheta_2$ represents the incident angle of incident natural light on the sawtooth surface.

Preferably, the lens form of the free-form surface array is a convex free-form surface or a concave free-form surface, the convex free-form surface or concave free-form surface faces the incident direction of natural light, and the normal of the lens surface forms an acute angle to the incident angle of natural light.

Preferably, for the convex free-form surface array, an expression of the thickness $d_1$ at different positions $x_1$ and $y_1$ on the convex free-form surface array is $$d_1(x_1, y_1) = \frac{1}{n}\left(\frac{x_1^2 + y_1^2}{r + \sqrt{r^2 + (x_1^2 + y_1^2)}} + y \cdot \sin\vartheta_3\right)$$

where n represents the refractive index, r represents the radius of curvature at the vertex of the convex free-form surface, $\vartheta_3$ represents a surface-type inclination angle of the convex free-form surface, which makes the light propagate in the horizontal direction through refraction, and the radius of curvature is 1-5 times the minimum spacing between the free-form surface and the sawtooth grating. For the concave free-form surface, an expression of the thickness $d_1$ at different positions $x_1$ and $y_1$ on the concave free-form surface array is $$d_1(x_1, y_1) = \frac{1}{n}\left(\frac{x_1^2 + y_1^2}{r + \sqrt{r^2 - (x_1^2 + y_1^2)}} + y_1 \cdot \sin\vartheta_3\right);$$

where n represents the refractive index, r represents the radius of curvature at the vertex of the concave free-form surface, and $\vartheta_3$ represents a surface-type inclination angle of the concave free-form surface, which makes the light propagate in the horizontal direction through refraction, and the radius of curvature is 1-5 times the minimum spacing between the free-form surface and the sawtooth grating.

Preferably, the inclination angle of the sawtooth in the sawtooth surface array is in the range of 20°-70°.

Preferably, the free-form surface array corresponds to the sawtooth surface array one to one, and the center position of the sawtooth matches the optical axis of the free-form surface lens unit.

Preferably, the monolithic device material is the high-transmittance material with a transmittance above 85%, including but not limited to glass, resin and transparent plastic.

Preferably, both front and real surface arrays are in the form of square full-aperture arrays with a high filling rate above 95%.

A natural light homogenization lighting method based on free-form surface and sawtooth grating, including: the outdoor natural light is collected by the free-form surface array, and transmitted to the sawtooth surface array through the intermediate medium made of the same material between the two surfaces; and the sawtooth surface array deflects the incident natural light to the indoor space after being refracted by an inclined surface.

The present invention provides an array-type natural light homogenization lighting device and method based on free-form surface and sawtooth grating, which can efficiently collect the natural light that enters from the window, evenly disperse the light to all corners indoors, and homogenize the indoor lighting thereby making full use of natural light for indoor lighting, saving energy and reducing emissions, and improving the energy utilization rate. Moreover, the combined structure of free-form surface array and sawtooth grating breaks the symmetry of light transmission and can effectively protect the indoor privacy. The device is in a monolithic form, and is thin and easy to mass produce, environmentally friendly and pollution-free, and can be used as lighting curtains, indoor shutters, window glasses and the like.

Figure 2:
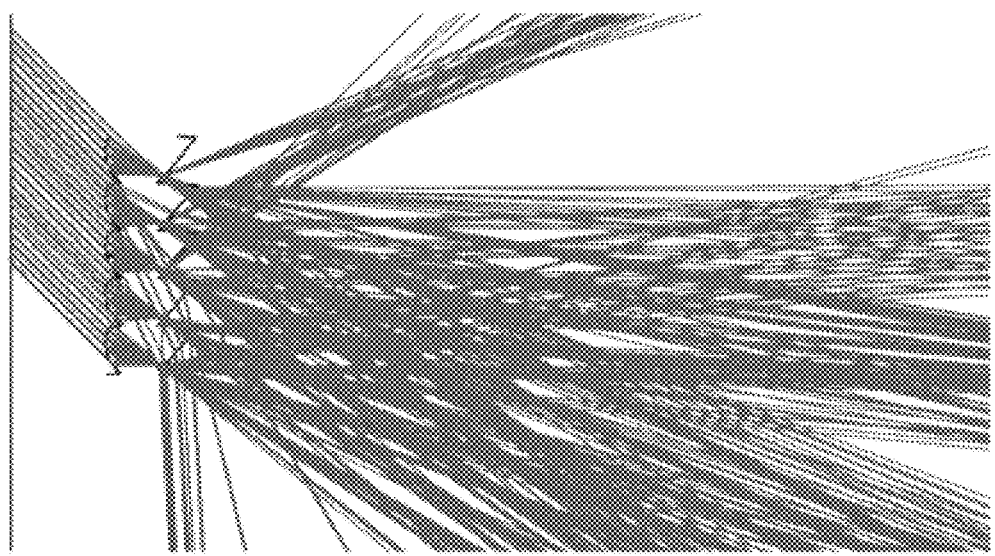

In the figure, the natural light at a high angle outdoors disperses horizontally to the indoor space after passing through the device;

FIG. 2 is a simulation result diagram of an array-type natural light homogenization lighting method based on convex free-form surface and sawtooth grating provided in Embodiment 1 of the present invention.

Figure 3A:
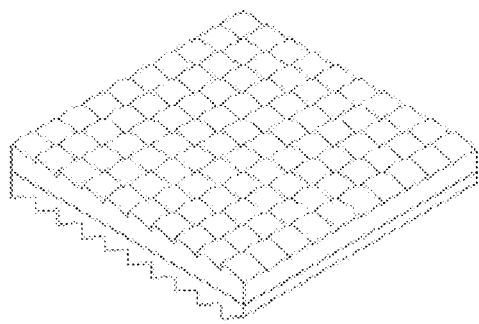
Figure 3B:
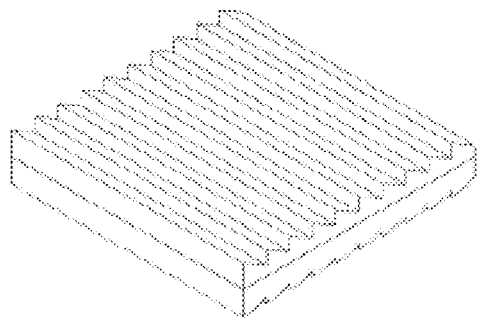

In the figure, the first surface of the design device is a convex free-form surface, and the second surface is a sawtooth surface array; the incident natural light at a high angle is collected by the lens array surface, and transmitted to the rear surface through the intermediate medium made of the same material between the two surfaces, and then horizontally dispersed to the indoor space after being refracted by an inclined surface;

FIG. 3A and FIG. 3B show three-dimensional views of a mechanical structure of an array-type natural light homogenization lighting method based on convex free-form surface and sawtooth grating of the present invention, where FIG. 3A is a convex free-form surface, and FIG. 3B is a sawtooth surface array.

Figure 4:
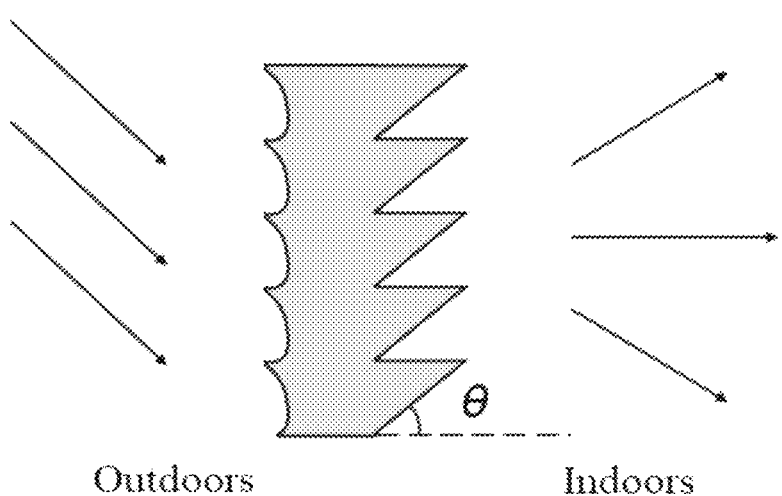

FIG. 4 is a schematic structural diagram of an array-type natural light homogenization lighting method based on concave free-form surface and sawtooth grating provided in Embodiment 3 of the present invention.

Figure 5:
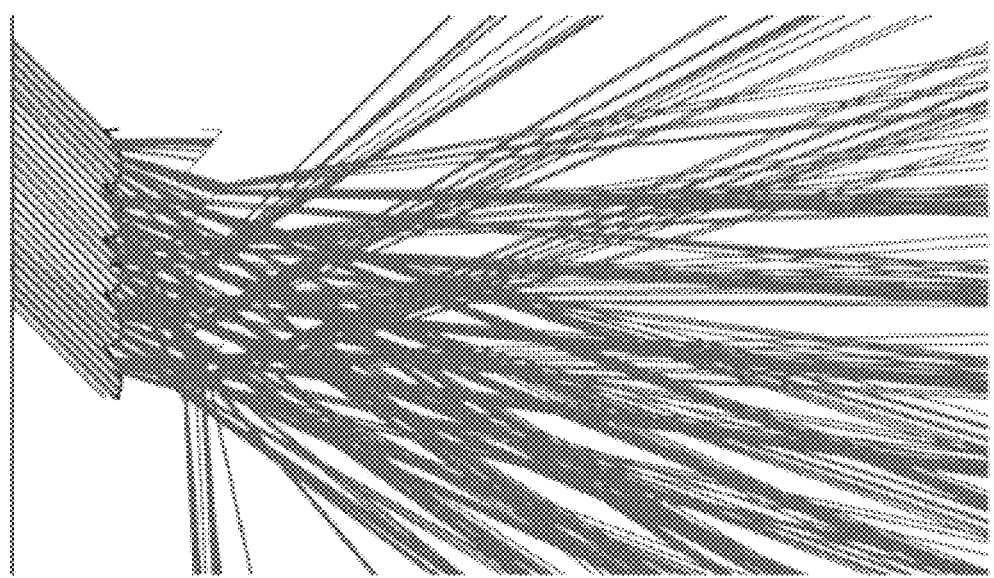

In the figure, the natural light at a high angle outdoors disperses horizontally to the indoor space after passing through the device;

FIG. 5 is a simulation result diagram of an array-type natural light homogenization lighting method based on concave free-form surface and sawtooth grating provided in Embodiment 3 of the present invention.

Figure 6A:
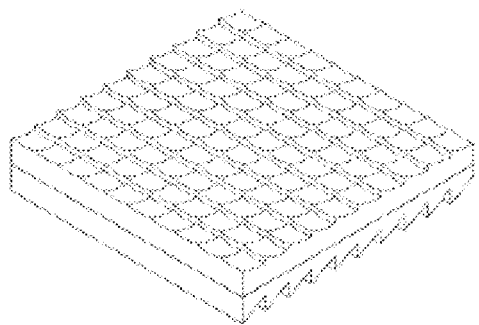
Figure 6B:
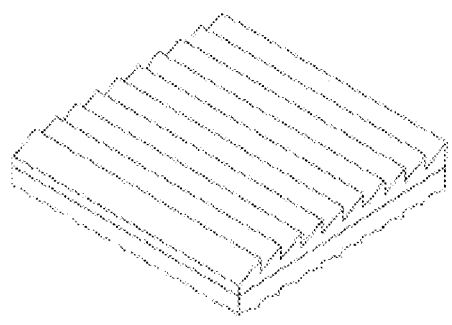

In the figure, the first surface of the design device is a concave free-form surface, and the second surface is a sawtooth surface array; the incident natural light at a high angle is collected by the lens array surface, and transmitted to the rear surface through the intermediate medium made of the same material between the two surfaces, and then horizontally dispersed to the indoor space after being refracted by an inclined surface; and FIG. 6A and FIG. 6B show three-dimensional views of a mechanical structure of an array-type natural light homogenization lighting method based on concave free-form surface and sawtooth grating of the present invention, where FIG. 6A is a concave free-form surface, and FIG. 6B is a sawtooth surface array.

DETAILED DESCRIPTION

Exemplary embodiments of the present invention will be described below in conjunction with the accompanying drawings. For the sake of clarity and conciseness, not all features of the actual implement are described in the description. However, it should be understood that many implementation-specific decisions must be made in the process of developing any such practical embodiment, so as to achieve specific objectives of the developers, such as meeting those restrictions associated with the system and the business, and those restrictions vary with the implementation. It should be also understood that although the development work is likely to be very complex and time-consuming, such development work is merely a routine task for those skilled in the art benefiting from the disclosure of the present invention.

It should be further noted that, in order to avoid obscuring the present invention due to unnecessary details, only the structure and/or processing steps closely related to the solution according to the present invention are shown in the accompanying drawings, while other details that have little to do with the present invention are omitted.

Figure 1:
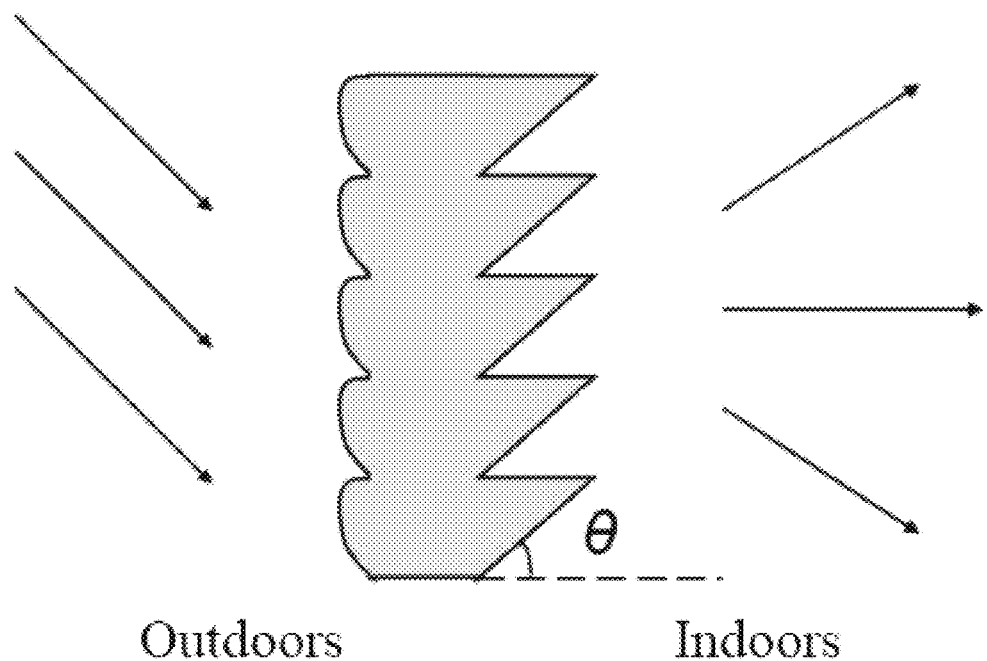
FIG. 1 is a schematic structural diagram of an array-type natural light homogenization lighting method based on convex free-form surface and sawtooth grating provided in Embodiment 1 of the present invention.

Embodiment 1: as shown in FIG. 1, the present embodiment provides an array-type natural light homogenization lighting device with a convex free-form surface and a sawtooth grating, the device includes a front surface and a rear surface in an array form, the first surface is a free-form surface array, and the lens form of the free-form surface array is a convex free-form surface, as shown in FIG. 3A; while the second surface is a sawtooth surface array, as shown in FIG. 3B; the outdoor natural light with a large angle is collected by the surface of the convex free-form surface array, and transmitted to the sawtooth surface array through the intermediate medium made of the same material between the two surfaces, and then deflected to the indoor space after being refracted by an inclined surface. Both the convex free-form surface array and the sawtooth surface array include n unit structures, which correspond to one to one, and n is a natural number greater than or equaling to 1.

More specifically, both the front surface and the rear surface in an array form realize the modulation of different phases of the incident light separately. Specifically, the additional phase modulation $\varphi_1$ of the first surface to the incident light can be expressed as $$\varphi_1 = -\frac{\pi(x_1^2 + y_1^2)}{\lambda f} - \frac{2\pi}{\lambda} y_1 \cdot \sin\theta_1,$$

where $\vartheta_1$ represents the incident angle of natural light on the convex free-form surface, $\lambda$ represents the incident wavelength, for which the central wavelength is generally taken, f represents the equivalent focal length, and $x_1$ and $y_1$ are the positions of the incident wavefront of the convex free-form surface array. The additional phase modulation of the second surface to the incident light can be expressed as $$\varphi_2 = -\frac{2\pi}{\lambda} y_2 \cdot \sin\vartheta_2,$$

where $y_2$ represents the position of the incident wavefront of the sawtooth surface array, and $\vartheta_2$ represents the incident angle of incident light on the sawtooth surface.

More specifically, the first surface is a convex free-form surface, the surface form is a spherical surface, a paraboloid or the like, the lens surface faces the incident direction of natural light, the normal of the lens surface forms an acute angle to the incident angle of natural light, and the outdoor natural light incident at a high angle can be dispersed in parallel to all corners indoors through the designed device.

More specifically, for the convex free-form surface, an expression of the thickness $d_1$ at different positions ($x_1$ and $y_1$) on the convex free-form surface array is $$d_1(x_1, y_1) = \frac{1}{n}\left(\frac{x_1^2 + y_1^2}{r + \sqrt{r^2 + (x_1^2 + y_1^2)}} + y \cdot \sin\vartheta_3\right);$$

where n represents the refractive index, r represents the radius of curvature at the vertex of the convex free-form surface, $\vartheta_3$ represents a surface-type inclination angle of the convex free-form surface, which makes the light propagate in the horizontal direction through refraction, and the radius of curvature is 1-5 times the minimum spacing between the free-form surface and the sawtooth grating.

More specifically, the sawtooth surface array refracts most of the light in the horizontal direction through refraction, and the inclination angle of the sawtooth is 20°-70°.

More specifically, the convex free-form surface array corresponds to the sawtooth surface array one to one, and the center position of the sawtooth matches the optical axis of the convex free-form surface unit.

More specifically, the monolithic device material shall be the high-transmittance material with a transmittance above 85%, including but not limited to glass, resin and transparent plastic.

More specifically, both front and real surface arrays are in the form of square full-aperture arrays with a high filling rate above 95%.

In order to verify the effect of the above device of the present invention, the radius of curvature of the convex free-form surface r=1 mm, the inclination angle of the convex free-form surface is 10°, and the inclination angle of grating on the sawtooth surface is 35°, the free-form surface array corresponds to the sawtooth grating one to one, the spacing between the two planes is 1.5 mm, the size of the array is 1 mm by 1 mm, a 5 by 5 array is selected, ZF6 glass is selected as the material, and the light divergence effect is simulated. The simulation results are shown in FIG. 2.

Embodiment 2: on the basis of the device in Embodiment 1, the present embodiment provides a natural light homogenization lighting method based on convex free-form surface and sawtooth grating, including: the outdoor natural light is collected by the free-form surface array, and transmitted to the sawtooth surface array through the intermediate medium made of the same material between the two surfaces, and the lens form of the free-form surface array is a convex free-form surface; and the sawtooth surface array deflects the incident natural light to the indoor space after being refracted by an inclined surface.

Embodiment 3: as shown in FIG. 4, the present embodiment provides an array-type natural light homogenization lighting device with a concave free-form surface and a sawtooth grating, the device includes a front surface and a rear surface in an array form, the first surface is a free-form surface array, and the lens form of the free-form surface array is a concave free-form surface, as shown in FIG. 6A; while the second surface is a sawtooth surface array, as shown in FIG. 6B; the outdoor natural light with a large angle is collected by the surface of the concave free-form surface array, and transmitted to the sawtooth surface array through the intermediate medium made of the same material between the two surfaces, and then deflected to the indoor space after being refracted by an inclined surface. Both the concave free-form surface array and the sawtooth surface array include n unit structures, which correspond to one to one, and n is a natural number greater than or equaling to 1.

More specifically, both the front surface and the rear surface in an array form realize the modulation of different phases of the incident light, separately. Specifically, the additional phase modulation $\varphi_1$ of the first surface to the incident light can be expressed as $$\varphi_1 = \frac{\pi(x_1^2 + y_1^2)}{\lambda f} - \frac{2\pi}{\lambda} y_1 \cdot \sin\theta_1,$$

where $\vartheta_1$ represents the incident angle of natural light on the concave free-form surface, $\lambda$ represents the incident wavelength, for which the central wavelength is generally taken, f represents the equivalent focal length, and $x_1$ and $y_1$ are the positions of the incident wavefront of the concave free-form surface array. The additional phase modulation $\varphi_2$ of the second surface to the incident light can be expressed as $$\varphi_2 = -\frac{2\pi}{\lambda} y_2 \cdot \sin\vartheta_2,$$

where $y_2$ represents the position of the incident wavefront of the sawtooth surface array, and $\vartheta_2$ represents the incident angle of incident light on the sawtooth surface.

More specifically, the first surface is a concave free-form surface, the lens surface faces the incident direction of natural light, the normal of the lens surface forms an acute angle to the incident angle of natural light, and the outdoor natural light incident at a high angle can be dispersed in parallel to all corners indoors through the designed device.

More specifically, for the concave free-form surface, an expression of the thickness $d_1$ at different positions ($x_1$ and $y_1$) on the concave free-form surface array is $$d_1(x_1, y_1) = \frac{1}{n}\left(\frac{x_1^2 + y_1^2}{r + \sqrt{r^2 - (x_1^2 + y_1^2)}} + y_1 \cdot \sin\vartheta_3\right);$$

where n represents the refractive index, r represents the radius of curvature at the vertex of the concave free-form surface, $\vartheta_3$ represents a surface-type inclination angle of the concave free-form surface, which makes the light propagate in the horizontal direction through refraction, and the radius of curvature is 1-5 times the minimum spacing between the free-form surface and the sawtooth grating.

More specifically, the sawtooth surface array refracts most of the light in the horizontal direction through refraction, and its inclination angle is 20°-70°.

More specifically, the concave free-form surface array corresponds to the sawtooth surface array one to one, and the center position of the sawtooth matches the optical axis of the concave free-form surface unit.

More specifically, the monolithic device material shall be the high-transmittance material with a transmittance above 85%, including but not limited to glass, resin and transparent plastic.

More specifically, both front and real surface arrays are arrays, and the array form is a square full-aperture array with a high filling rate above 95%.

In order to verify the effect of the above device of the present invention, the radius of curvature of the concave free-form surface r=−1 mm, the inclination angle of the concave free-form surface is 10°, and the inclination angle of grating on the sawtooth surface is 35°, the free-form surface array corresponds to the sawtooth grating one to one, the spacing between the two planes is 1.5 mm, the size of the array is 1 mm by 1 mm, a 5 by 5 array is selected, ZF6 glass is selected as the material, and the light divergence effect is simulated. The simulation results are shown in FIG. 5.

Embodiment 4: on the basis of the device in Embodiment 3, the present embodiment provides a natural light homogenization lighting method based on concave free-form surface and sawtooth grating, including: the outdoor natural light is collected by the free-form surface array, and transmitted to the sawtooth surface array through the intermediate medium made of the same material between the two surfaces, and the lens form of the free-form surface array is a concave free-form surface; and the sawtooth surface array deflects the incident natural light to the indoor space after being refracted by an inclined surface.

Although the implementation disclosed in the present invention is described as above, the contents thereof are only the implementation adopted to facilitate the understanding of the technical solutions of the present invention, and are not intended to limit the present invention. Those skilled in the art to which the present invention belongs may make any modifications and changes in the form and details of the implementation without departing from the core technical solution disclosed in the present invention, but the scope of protection limited by the present invention shall still be subject to the scope limited by the appended claims.

The invention claimed is:

1. A natural light homogenization lighting device, comprising a front surface array and a rear surface array,
    wherein the front surface array is a free-form surface array, the rear surface array is a sawtooth surface array, and the free-form surface array is configured to collect outdoor natural light, and to transmit the outdoor natural light to the sawtooth surface array through an intermediate medium; and
    wherein the sawtooth surface array is configured to deflect the incident natural light to an indoor space after the outdoor natural light is refracted by an inclined surface;
    wherein the lens form of the free-form surface array is a convex free-form surface or a concave free-form surface, the convex free-form surface or concave free-form surface faces the incident direction of natural light, and the normal of the lens surface forms an acute angle to the incident angle of natural light;
    for the convex free-form surface, an expression of the thickness d 1 at different positions $x_1$ and $y_1$ is $$d_1(x_1, y_1) = \frac{1}{n}\left(\frac{x_1^2 + y_1^2}{r + \sqrt{r^2 + (x_1^2 + y_1^2)}} + y \cdot \sin\vartheta_3\right);$$

wherein n represents the refractive index, r represents the radius of curvature at the vertex of the convex free-form surface, $\vartheta_3$ represents a surface-type inclination angle of the convex free-form surface, which makes the light propagate in the horizontal direction through refraction, and the radius of curvature is 1-5 times the minimum spacing between the free-form surface and the sawtooth grating; for the concave free-form surface, an expression of the thickness $d_2$ at different positions $x_1$ and $y_1$ on the concave free-form surface array is $$d_1(x_1, y_1) = \frac{1}{n}\left(\frac{x_1^2 + y_1^2}{r + \sqrt{r^2 - (x_1^2 + y_1^2)}} + y_1 \cdot \sin\vartheta_3\right);$$

where n represents the refractive index, r represents the radius of curvature at the vertex of the concave free-form surface, and $\vartheta_3$ represents a surface-type inclination angle of the concave free-form surface, which makes the light propagate in the horizontal direction through refraction, and the radius of curvature is 1-5 times the minimum spacing between the free-form surface and the sawtooth grating.

2. The natural light homogenization lighting device according to claim 1, wherein an additional phase modulation $\varphi_1$ of the free-form surface array to the incident light is expressed as $$\varphi_1 = \pm\frac{\pi(x_1^2 + y_1^2)}{\lambda f} - \frac{2\pi}{\lambda}y_1 \cdot \sin\theta_1,$$

wherein $\vartheta_1$ represents the incident angle of natural light on the free-form surface, $\lambda$ represents the central wavelength of the incident light, f represents the equivalent focal length of the free-form surface, $x_1$ and $y_1$ are the positions of the incident wavefront of the free-form surface array, while an additional phase modulation $\varphi_2$ of the sawtooth surface array to the incident natural light is expressed as $$\varphi_2 = -\frac{2\pi}{\lambda}y_2 \cdot \sin\vartheta_2,$$

wherein $y_2$ represents the position of the incident wavefront of the sawtooth surface array, and $\vartheta_2$ represents the incident angle of incident natural light on the sawtooth surface.

3. The natural light homogenization lighting device according to claim 1, wherein an inclination angle of the sawtooth in the sawtooth surface array is in a range of 20°-70°.

4. The natural light homogenization lighting device according to claim 1, wherein both the front surface array and the real surface array are in the form of square full-aperture arrays with a filling rate above 95%.

5. A method of using the natural light homogenization lighting device of claim 1, comprising:

collecting light by the free-form surface array, and transmitting the light to the sawtooth surface array through the intermediate medium; and deflecting the light with the sawtooth surface array to the indoor space after the light is refracted by the inclined surface.

* * * * *